United States Patent
Keller et al.

(10) Patent No.: US 10,281,982 B2
(45) Date of Patent: May 7, 2019

(54) INFLATABLE ACTUATORS IN VIRTUAL REALITY

(71) Applicant: Facebook Technologies, LLC, Menlo Park, CA (US)

(72) Inventors: Sean Jason Keller, Kirkland, WA (US); David R. Perek, Bellevue, WA (US); Tristan Thomas Trutna, Seattle, WA (US); Garett Andrew Ochs, Seattle, WA (US); Nicholas Roy Corson, Mukilteo, WA (US); Raymond King, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 104 days.

(21) Appl. No.: 15/295,725

(22) Filed: Oct. 17, 2016

(65) Prior Publication Data
US 2018/0107277 A1 Apr. 19, 2018

(51) Int. Cl.
*G06F 3/01* (2006.01)

(52) U.S. Cl.
CPC ............. *G06F 3/016* (2013.01); *G06F 3/014* (2013.01)

(58) Field of Classification Search
CPC .................................. G06F 3/016; G06F 3/014
USPC ....................................................... 340/407.1
See application file for complete search history.

(56) References Cited

U.S. PATENT DOCUMENTS 9,104,271 B1 * 8/2015 Adams .................. G06F 3/0426

* cited by examiner

*Primary Examiner* — Daryl C Pope
(74) *Attorney, Agent, or Firm* — Fenwick & West LLP

(57) ABSTRACT

A haptic feedback glove worn by a user provides an amount of a resistance to a physical movement of a portion of the user's hand. The haptic feedback glove includes a glove body, an expandable bladder and a pressure source. The glove body includes a first portion corresponding to a first phalange of a user hand, a second portion corresponding to a second phalange of the user hand, and a third portion corresponding to a joint between the first phalange and the second phalange of the user hand. The expandable bladder is coupled to the third portion of the glove body. The expandable bladder has an adjustable size that controls an amount of relative movement between the first portion and the second portion of the glove body. The pressure source is coupled to the glove body, and is configured to adjust the size of the expandable bladder.

15 Claims, 5 Drawing Sheets

INFLATABLE ACTUATORS IN VIRTUAL REALITY

BACKGROUND

The present disclosure generally relates to a system for haptic feedback to a user, and specifically to haptic devices that simulate presence of virtual objects.

Virtual reality (VR) is a simulated environment created by computer technology, and augmented reality (AR) is a live direct or indirect view of a physical, real-world environment whose elements are augmented (or supplemented) by computer technology. VR or AR can be presented to a user through a VR/AR system. Typically, a VR/AR system includes a VR/AR headset that provides visual and audio information to the user. Conventional VR/AR systems create virtual body parts (e.g., a virtual hand) in the simulated environment and use a tracking system to track a user movement in a physical space. The simulated environment presented to the user may be updated according to the user movement in the physical space. However, such systems generally do not prevent or control the user movement in the physical space, as the user is in contact with virtual objects in the simulated environment. As a result, a user cannot perceive a feeling of touching a virtual object.

SUMMARY

Embodiments relate to a system and a method for providing haptic feedback to a user by providing an amount of a resistance to a physical movement of a portion of the user.

In one or more embodiments, the system comprises a haptic glove including a glove body including a first portion, a second portion, and a third portion, the first portion corresponding to a first phalange of a user hand, the second portion corresponding to a second phalange of the user hand, and the third portion corresponding to a joint between the first phalange and the second phalange of the user hand; an expandable bladder coupled to the third portion of the glove body, the expandable bladder having an adjustable size that controls an amount of relative movement between the first portion and the second portion of the glove body; and a pressure source coupled to the glove body, wherein the pressure source is configured to adjust the size of the expandable bladder.

In one or more embodiments, the pressure source is configured to increase the size of the expandable bladder to resist the relative movement.

In one or more embodiments, the pressure source is configured to decrease the size of the expandable bladder to allow the relative movement.

In one or more embodiments, the haptic glove further includes a location sensor coupled to the glove body, the location sensor for determining a physical position of the glove body with respect to a reference point.

In one or more embodiments, the first phalange and the second phalange of the user hand are part of a same finger of the user hand.

In one or more embodiments, the first phalange and the second phalange of the user hand are each part of a different finger of the user hand.

In one or more embodiments, the system comprises a haptic glove including a glove body including a first portion, a second portion, and a third portion, the first portion corresponding to a first phalange of a user hand, the second portion corresponding to a second phalange of the user hand, and the third portion corresponding to a joint between the first phalange and the second phalange of the user hand; an expandable bladder coupled to the third portion of the glove body, the expandable bladder having an adjustable size that controls an amount of relative movement between the first portion and the second portion of the glove body; and a pressure source coupled to the glove body, wherein the pressure source is configured to adjust the size of the expandable bladder, via adjusting fluid pressure within the expandable bladder, to resist the relative movement between the first portion and the second portion of the glove body based in part on instructions received from a console.

In one or more embodiments, the pressure source is configured to decrease the fluid pressure of the expandable bladder to allow the relative movement between the first portion and the second portion of the glove body.

In one or more embodiments, the pressure source is configured to increase the fluid pressure of the expandable bladder to resist the relative movement between the first portion and the second portion of the glove body.

In one or more embodiments, the haptic glove further includes a location sensor coupled to the glove body, the location sensor for determining a physical position of the glove body with respect to a reference point.

In one or more embodiments, the first phalange and the second phalange of the user hand are part of a same finger of the user hand.

In one or more embodiments, the first phalange and the second phalange of the user hand are each part of a different finger of the user hand.

In one or more embodiments, the system comprises a haptic glove including a glove body including a first portion, a second portion, and a third portion, the first portion corresponding to a first location on a first phalange of a user hand, the second portion corresponding to a second location on the phalange of the user hand, and the third portion corresponding to a joint between the first location and the second location of the user hand; an expandable bladder coupled to the third portion of the glove body, the expandable bladder having an adjustable size that controls an amount of relative movement between the first portion and the second portion of the glove body; and a pressure source coupled to the glove body, wherein the pressure source is configured to adjust a size of the expandable bladder, via adjusting fluid pressure within the expandable bladder.

In one or more embodiments, the pressure source is configured to adjust the pressure of the expandable bladder. The pressure source may be configured to increase the fluid pressure of the expandable bladder to resist the relative movement. The pressure source may be also configured to decrease the fluid pressure of the expandable bladder to allow the relative movement.

Figure 1:
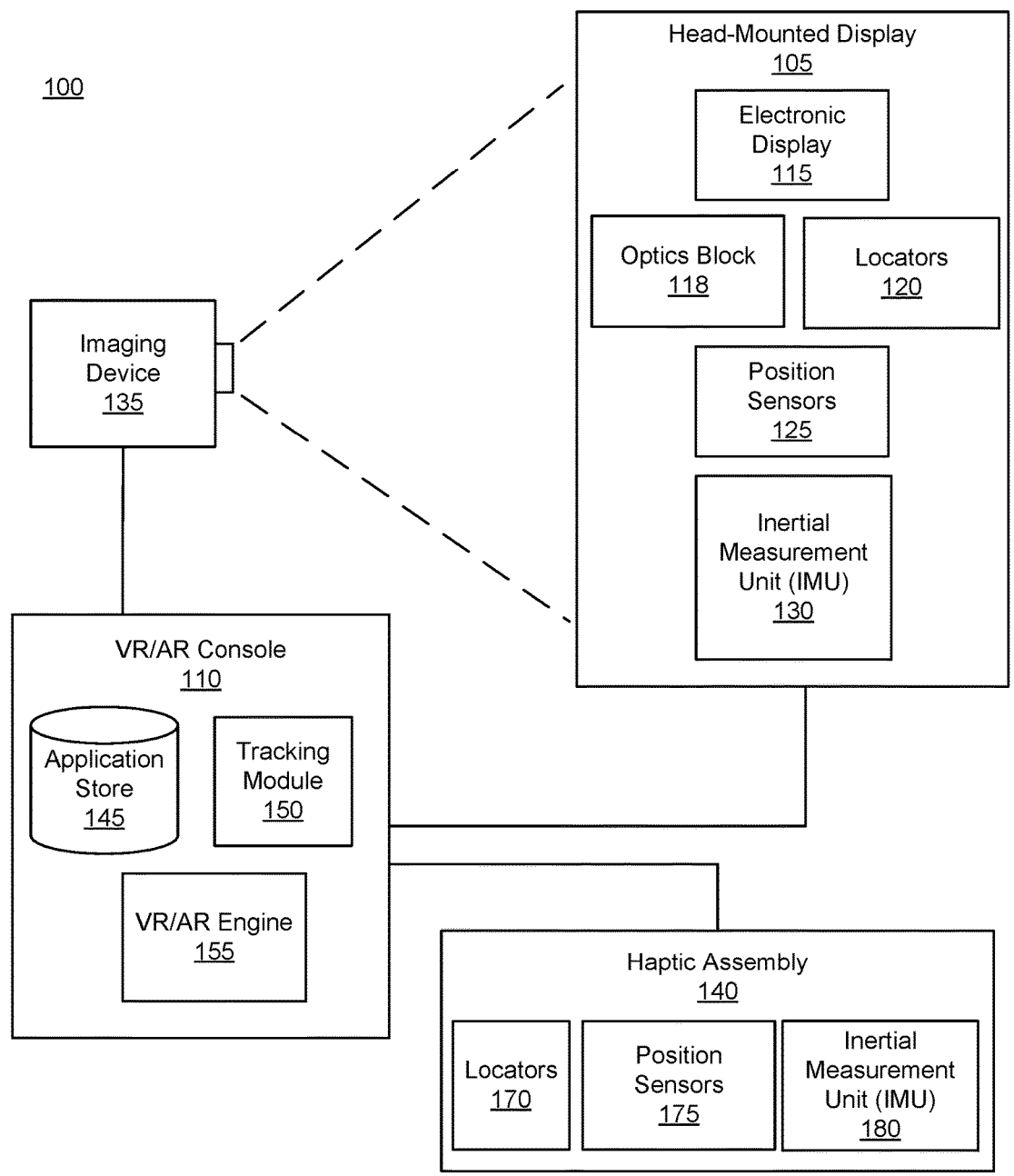
FIG. 1 is a block diagram of a system environment including a VR/AR system, in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

Embodiments relate to a system and a method for providing haptic feedback to a user by adjusting, via a haptic assembly, a physical movement of a portion of the user. The adjusting of the physical movement is in response to a virtual position of the portion of the user in a VR/AR space. In some embodiments, the VR/AR space may include a mixed reality (MR) space. The virtual position corresponds to a physical position of the portion of the user.

In one embodiment, a virtual object is presented to the user, and a physical position of a portion of the user (e.g., a position of the user's hand and fingers) is mapped to a corresponding virtual position in a virtual space associated with the virtual object. Responsive to determining the portion of the user is in contact with the virtual object in the virtual space, the haptic feedback is provided to resist a physical movement of the portion of the user corresponding to a virtual movement through the virtual object.

In one embodiment, an amount of resistance is determined based on a hardness of the virtual object in contact with the portion of the user and an amount of force applied by the portion of the user. The amount of force can be obtained based on a speed or an acceleration of the physical movement of the portion of the user. Responsive to determining a value of the hardness of the virtual object is greater than the amount of force applied by the portion of the user, the haptic assembly resists the physical movement corresponding to the virtual movement through the virtual object. Responsive to determining a value of the hardness of the virtual object is less than the amount of force applied by the portion of the user, the haptic assembly may allow the user movement without resistance, or provide an amount of resistance to the physical movement to slow down the user movement.

In one embodiment, the system includes a haptic glove for providing haptic feedback. The haptic glove includes expandable haptic apparatuses coupled to one or more fingers of the glove, and one or more tubes coupled to the expandable haptic apparatuses. A shape or a size of one or more haptic apparatuses can be changed to provide resistance to a physical movement of the one or more fingers. The expandable bladder can be inflated or deflated to prevent or allow a user movement, in accordance with the user movement in a virtual space.

In one aspect, the haptic glove is implemented in a VR/AR system for providing a VR, an augmented reality (AR), a mixed reality (MR), or some combination thereof, experience to a user. For example, the system may augment views of a physical, real-world environment with computer-generated virtual objects. The VR/AR system includes a head mounted display for presenting a virtual object in, e.g., a VR environment, an AR environment, or a MR environment to the user according to positional information of the head mounted system. In addition, the VR/AR system includes the haptic glove for providing haptic feedback to a user. A physical position of the haptic glove is tracked, and mapped to a corresponding virtual position in the virtual environment. The VR/AR system updates the image of the 3-D virtual environment according to a positional information of the head mounted display and/or haptic glove. The VR/AR system also provides haptic feedback to the user via the haptic glove. Specifically, the haptic glove with the one or more inflatable haptic apparatuses disclosed herein can provide the haptic feedback to provide an amount of resistance to a physical movement of one or more fingers of the user according to the corresponding virtual position and a virtual position of a virtual object in contact with the one or more fingers in the virtual space. Hence, the user can perceive a feeling of touching an imaginary object, and enjoy a better immersive VR/AR experience.

System Overview

FIG. 1 is a block diagram of a VR/AR system environment 100 in which a VR/AR console 110 operates. The system environment 100 shown by FIG. 1 comprises a head-mounted display (HMD) 105 (also referred to as "a headset 105"), an imaging device 135, and a haptic assembly 140. While FIG. 1 shows an example system 100 including one HMD 105, one imaging device 135, and one haptic assembly 140 (e.g., a haptic glove), in other embodiments any number of these components may be included in the system 100. For example, there may be multiple VR/AR headsets 105 each having an associated haptic assembly 140 and being monitored by one or more imaging devices 135, with each HMD 105, haptic assembly 140, and imaging devices 135 communicating with the VR/AR console 110. In alternative configurations, different and/or additional components may be included in the system environment 100. Similarly, the functions can be distributed among the components in a different manner than is described here. For example, some or all of the functionality of the VR/AR console 110 may be contained within the HMD 105.

The HMD 105 is a head-mounted display that presents media to a user. Examples of media presented by the HMD 105 include one or more images, video, audio, or any combination thereof. In some embodiments, audio is presented via an external device (e.g., speakers and/or headphones) that receives audio information from the HMD 105, the VR/AR console 110, or both, and presents audio data based on the audio information. The HMD 105 may augment views of a physical, real-world environment with computer-generated elements (e.g., images, video, sound, etc.).

The HMD 105 includes an electronic display 115, an optics block 118, one or more locators 120, one or more position sensors 125, and an inertial measurement unit (IMU) 130. The electronic display 115 displays images to the user in accordance with data received from the VR/AR console 110.

The optics block 118 magnifies received light from the electronic display 115, and corrects optical errors associated with the image light. The corrected image light is presented to a user of the HMD 105. An optical element may be an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as anti-reflective coatings.

The locators 120 are objects located in specific positions on the HMD 105 relative to one another and relative to a specific reference point of the HMD 105 on the HMD 105.

A locator 120 may be a light emitting diode (LED), a corner cube reflector, a reflective marker, a type of light source that contrasts with an environment in which the HMD 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the HMD 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the HMD 105 are opaque in the visible band of wavelengths of light. Thus, the locators 120 may emit light in the IR band under an outer surface that is transparent in the IR band but opaque in the visible band.

The IMU 130 is an electronic device that generates fast calibration data (herein also referred to as "fast calibration information") of the HMD 105 based on measurement signals received from one or more of the position sensors 125. A position sensor 125 generates one or more measurement signals in response to motion of the HMD 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data of the HMD 105 indicating an estimated position of the HMD 105 relative to an initial position of the HMD 105. For example, the position sensors 125 include multiple accelerometers to measure translational motion (forward/back, up/down, left/right) and multiple gyroscopes to measure rotational motion (e.g., pitch, yaw, roll) of the HMD 105. In some embodiments, the IMU 130 rapidly samples the measurement signals and calculates the estimated position of the HMD 105 from the sampled data. For example, the IMU 130 integrates the measurement signals received from the accelerometers over time to estimate a velocity vector and integrates the velocity vector over time to determine an estimated position of a reference point of the HMD 105 on the HMD 105. Alternatively, the IMU 130 provides the sampled measurement signals to the VR/AR console 110, which determines the fast calibration data of the HMD 105. The reference point of the HMD 105 is a point that may be used to describe the position of the HMD 105. While the reference point of the HMD 105 may generally be defined as a point in space; however, in practice the reference point of the HMD 105 is defined as a point within the HMD 105 (e.g., a center of the IMU 130).

The IMU 130 receives one or more calibration parameters of the HMD 105 from the VR/AR console 110. As further discussed below, the one or more calibration parameters of the HMD 105 are used to maintain tracking of the HMD 105. Based on a received calibration parameter of the HMD 105, the IMU 130 may adjust one or more IMU parameters (e.g., sample rate). In some embodiments, certain calibration parameters of the HMD 105 cause the IMU 130 to update an initial position of the reference point of the HMD 105 so it corresponds to a next calibrated position of the reference point of the HMD 105. Updating the initial position of the reference point of the HMD 105 as the next calibrated position of the reference point of the HMD 105 helps reduce accumulated error associated with the determined estimated position. The accumulated error, also referred to as drift error, causes the estimated position of the reference point of the HMD 105 to "drift" away from the actual position of the reference point of the HMD 105 over time.

The haptic assembly 140 is an apparatus for providing haptic feedback to the user. The haptic assembly 140 includes locators 170, one or more position sensors 175, and an inertial measurement unit (IMU) 180. In some embodiments, the locators 170, one or more position sensors 175, an inertial measurement unit (IMU) 180 are employed to determine a physical position or movement of the haptic assembly 140. In addition, the haptic assembly 140 receives, from the VR/AR console 110, a haptic feedback signal corresponding to haptic feedback to the user. The haptic assembly 140 provides to the user the haptic feedback of touching a virtual object in a virtual space, according to the haptic feedback signal. Specifically, the haptic assembly 140 provides an amount of resistance to a physical movement of a portion of a user in contact with the virtual object in the virtual space.

In one embodiment, the amount of resistance may vary depending on a hardness of the virtual object and force (e.g., measured based on velocity or acceleration) applied by the user. If force applied by the user finger is determined to be insufficient (for example, force is less than the hardness value or a threshold value) to break or deform the virtual object (e.g., rock), the haptic assembly 140 prevents a physical movement of the user finger to move in a direction through the virtual object in the virtual space. In one example, if force applied by the user finger is determined to be larger than the hardness of the virtual object to break or penetrate the virtual object (e.g., egg), the haptic assembly 140 can provide no resistance to allow the user movement through the virtual egg. In another example, if force applied by the user finger is determined to be larger than the hardness of the virtual object to deform the virtual object (e.g., rubber ball), the haptic assembly 140 can provide an amount of resistance to slow down the physical movement. Accordingly, the user can receive a perception of contacting the virtual object.

In one embodiment, the haptic feedback signal indicates a position or a portion of the haptic assembly 140 to be actuated, and an amount of actuation of the position or the portion of the haptic assembly 140 for providing haptic feedback. In this embodiment, the amount of actuation is determined by, e.g., the VR/AR console 110, according to a virtual position of the haptic assembly 140 corresponding to a physical position of the haptic assembly 140 and a virtual position of a virtual object in a virtual space. The haptic assembly 140 provides tactile perception of a user touching the virtual object according to the amount of actuation indicated by the haptic feedback signal.

The locators 170 are objects located in specific positions on the haptic assembly 140 relative to one another and relative to a specific reference point of the haptic assembly 140 on the haptic assembly 140. A locator 170 is substantially similar to a locator 120 except that a locator 170 is part of the haptic assembly 140. Additionally, in some embodiments, the outer surface or other portions of the haptic assembly 140 are opaque in the visible band of wavelengths of light. Thus, the locators 170 may emit light in the IR band under an outer surface that is transparent in the IR band but opaque in the visible band.

A position sensor 175 generates one or more measurement signals in response to motion of the haptic assembly 140. The position sensors 175 are substantially similar to the positions sensors 125, except that the position sensors 175 are part of the haptic assembly 140. The position sensors 175 may be located external to the IMU 180, internal to the IMU 180, or some combination thereof.

Based on the one or more measurement signals from one or more position sensors 175, the IMU 180 generates fast calibration data of the haptic assembly 140 indicating an estimated position of the haptic assembly 140 relative to an initial position of the haptic assembly 140. For example, the position sensors 175 include multiple accelerometers to measure translational motion (forward/back, up/down, left/right) and multiple gyroscopes to measure rotational motion (e.g., pitch, yaw, roll) of the haptic assembly 140. In some embodiments, the IMU 180 rapidly samples the measurement signals and calculates the estimated position of the haptic assembly 140 from the sampled data. For example, the IMU 180 integrates the measurement signals received from the accelerometers over time to estimate a velocity vector and integrates the velocity vector over time to determine an estimated position of a reference point of the haptic assembly 140. Alternatively, the IMU 180 provides the sampled measurement signals to the VR/AR console 110, which determines the fast calibration data of the haptic assembly 140. The reference point of the haptic assembly 140 is a point that may be used to describe the position of the haptic assembly 140. While the reference point of the haptic assembly 140 may generally be defined as a point in space; however, in practice the reference point of the haptic assembly 140 is defined as a point within the haptic assembly 140 (e.g., a center of the IMU 180).

The IMU 180 receives one or more calibration parameters of the haptic assembly 140 from the VR/AR console 110. As further discussed below, the one or more calibration parameters of the haptic assembly 140 are used to maintain tracking of the haptic assembly 140. Based on a received calibration parameter of the haptic assembly 140, the IMU 180 may adjust one or more IMU parameters (e.g., sample rate). In some embodiments, certain calibration parameters of the haptic assembly 140 cause the IMU 180 to update an initial position of the reference point of the haptic assembly 140 so it corresponds to a next calibrated position of the reference point of the haptic assembly 140. Updating the initial position of the reference point of the haptic assembly 140 as the next calibrated position of the reference point of the haptic assembly 140 helps reduce accumulated error associated with the determined estimated position.

The haptic assembly 140 provides haptic feedback including a perception of contacting a virtual object. In one embodiment, the haptic assembly 140 includes an expandable bladder. The expandable bladder can be inflated to resist a user movement. In one embodiment, the haptic assembly 140 actuates the expandable bladder according to the haptic feedback signal from the VR/AR console 110. Different embodiments of the haptic assembly 140 and its operation are described in detail below with respect to FIGS. 2-4. In one embodiment, the haptic assembly 140 is a haptic glove through which the VR/AR console 110 can detect a user hand movement and provide a perception of contacting a virtual object, as described in detail with respect to FIGS. 2-5.

The imaging device 135 generates slow calibration data in accordance with calibration parameters received from the VR/AR console 110. Slow calibration data (herein also referred to as "slow calibration information") of the VR/AR headset includes one or more images showing observed positions of the locators 120 associated with the HMD 105 that are detectable by the imaging device 135. Similarly, slow calibration data of the haptic assembly 140 includes one or more images showing observed positions of the locators 170 associated with the haptic assembly 140 that are detectable by the imaging device 135. In one aspect, the slow calibration data includes one or more images of both the HMD 105 and haptic assembly 140. The imaging device 135 may include one or more cameras, one or more video cameras, any other device capable of capturing images including one or more of the locators 120 and 170, or any combination thereof. Additionally, the imaging device 135 may include one or more filters (e.g., used to increase signal to noise ratio). The imaging device 135 is configured to detect light emitted or reflected from locators 120 and 170 in a field of view of the imaging device 135. In embodiments where the locators 120 and 170 include passive elements (e.g., a retroreflector), the imaging device 135 may include a light source that illuminates some or all of the locators 120 and 170, which retro-reflect the light towards the light source in the imaging device 135. Slow calibration data is communicated from the imaging device 135 to the VR/AR console 110, and the imaging device 135 receives one or more calibration parameters from the VR/AR console 110 to adjust one or more imaging parameters (e.g., focal length, focus, frame rate, ISO, sensor temperature, shutter speed, aperture, etc.).

The VR/AR console 110 provides media to the HMD 105 for presentation to the user in accordance with information received from one or more of: the imaging device 135, the HMD 105, and the haptic assembly 140. The VR/AR console 110 may also instruct the haptic assembly 140 to provide haptic feedback including a perception of a user contacting a virtual object. In the example shown in FIG. 1, the VR/AR console 110 includes an application store 145, a tracking module 150, and a VR/AR engine 155. Some embodiments of the VR/AR console 110 have different modules than those described in conjunction with FIG. 1. Similarly, the functions further described below may be distributed among components of the VR/AR console 110 in a different manner than is described here.

The application store 145 stores one or more applications for execution by the VR/AR console 110. An application is a group of instructions, that when executed by a processor, generates content for presentation to the user. Content generated by an application may be in response to inputs received from the user via movement of the HMD 105 or the VR/AR haptic assembly 140. Examples of applications include: gaming applications, conferencing applications, video playback application, or other suitable applications.

The tracking module 150 calibrates the VR/AR system 100 using one or more calibration parameters and may adjust one or more calibration parameters to reduce error in determination of the position of the HMD 105 and/or the haptic assembly 140.

The tracking module 150 tracks movements of the HMD 105 using slow calibration information of the HMD 105 from the imaging device 135. The tracking module 150 determines positions of a reference point of the HMD 105 using observed locators from the slow calibration information and a model of the HMD 105. The tracking module 150 also determines positions of a reference point of the HMD 105 using position information from the fast calibration information of the HMD 105. Additionally, in some embodiments, the tracking module 150 may use portions of the fast calibration information, the slow calibration information, or some combination thereof of the HMD 105, to predict a future location of the headset 105. The tracking module 150 provides the estimated or predicted future position of the HMD 105 to the VR/AR engine 155.

The VR/AR engine 155 executes applications within the system environment 100 and receives position information, acceleration information, velocity information, predicted future positions, or some combination thereof of the HMD 105 from the tracking module 150. Based on the received information, the VR/AR engine 155 determines content to provide to the HMD 105 for presentation to the user. For example, if the received information indicates that the user has looked to the left, the VR/AR engine 155 generates content for the HMD 105 that mirrors the user's movement in a virtual environment. Additionally, the VR/AR engine 155 performs an action within an application executing on the VR console 110 in response to detecting a motion of the haptic assembly 140 and provides feedback to the user that the action was performed. In one example, the VR/AR engine 155 instructs the HMD 105 to provide visual or audible feedback to the user. In another example, the VR/AR engine 155 instructs the haptic assembly 140 to provide haptic feedback including a perception of a user touching a virtual object.

In addition, the VR/AR engine 155 receives position information, acceleration information, velocity information, predicted future positions, or some combination thereof of the haptic assembly 140 from the tracking module 150 and determines whether a virtual touch event occurred. A virtual touch event herein refers to an event of a user contacting a virtual object in a virtual space. For example, an image of a virtual object is presented to the user on the HMD 105. Meanwhile, the VR/AR engine 155 collectively analyzes positions of multiple sensors of the haptic assembly 140 through the tracking module 150, and generates a three dimensional mapping of the haptic assembly 140 describing the position and the shape of the haptic assembly 140. The three dimensional mapping of the haptic assembly 140 describes coordinates of various parts of the haptic assembly 140 in a virtual space corresponding to physical positions of the parts of the haptic assembly 140 in reality. Responsive to the user performing an action to grab the virtual object or the user being contacted by the virtual object, the VR/AR engine 155 determines that the virtual touch event occurred.

In one embodiment, the VR/AR engine 155 compares coordinates of a virtual object and a coordinate of the haptic assembly 140 in a virtual space to determine whether a virtual touch event occurred. The VR/AR engine 155 obtains a coordinate of the virtual object in a virtual space, in accordance with an image presented via the HMD 105. Additionally, the VR/AR engine 155 obtains a coordinate of the haptic assembly 140 (e.g., haptic glove) corresponding to a physical position of the VR/AR haptic assembly 140 from the tracking module 150 or the three dimensional mapping of the haptic assembly 140. Then, the VR/AR engine 155 compares the coordinate of the virtual object in the virtual space and the coordinate of the haptic assembly 140 in the virtual space. For example, if two coordinates of the virtual object and the haptic assembly 140 overlap or are approximate to each other within a predetermined distance for a predetermined amount of time (e.g., 1 second), the VR/AR console 110 determines the virtual touch event occurred.

In one embodiment, the VR/AR engine 155 generates a haptic feedback signal to simulate a user touching a virtual object (i.e., provide a perception to a user that the user is touching an object). Responsive to detecting the virtual touch event, the VR/AR engine 155 determines an amount of resistance to provide to the user. For example, if a user's finger is in touch with a virtual object, the VR/AR engine 155 determines an amount of force of the user movement, based on the velocity or acceleration of the user movement. The velocity or acceleration of the user movement can be obtained, for example, according to the movement tracked by the tracing module 150. The VR/AR engine 155 obtains a value of hardness of the virtual object in contact with the user finger, and compares the value of hardness with the determined force. In one example, responsive to determining that the force of the user movement is less than the value of hardness (or a threshold value) of the virtual object, the VR/AR engine 155 determines that the user cannot bend the finger in a physical direction corresponding to a virtual direction through the virtual object. Responsive to determining that the force of the user movement is larger than the value of hardness (or the threshold value) of the virtual object, the VR/AR engine 155 determines that the user can bend the finger in the physical direction corresponding to the virtual direction through the virtual object. In one example, the VR/AR engine 155 determines that the user movement breaks the virtual object (e.g., egg), and determines to provide no resistance to the user movement. In another example, the VR/AR engine 155 determines that the user movement deforms the virtual object (e.g., marshmallow), and determines to an amount of resistance corresponding to the deformation of the virtual object and the force of the user movement. The VR/AR engine 155 determines a portion (e.g., a coordinate or a position) of the haptic assembly 140 to be actuated (e.g., inflated or deflated) and amount of actuation (e.g., a degree or amount of inflation). The VR/AR engine 155 provides the haptic feedback signal indicating the portion of the haptic assembly 140 and the amount of actuation to the haptic assembly 140 for executing the haptic feedback.

Example Haptic Feedback Device

Figure 2:
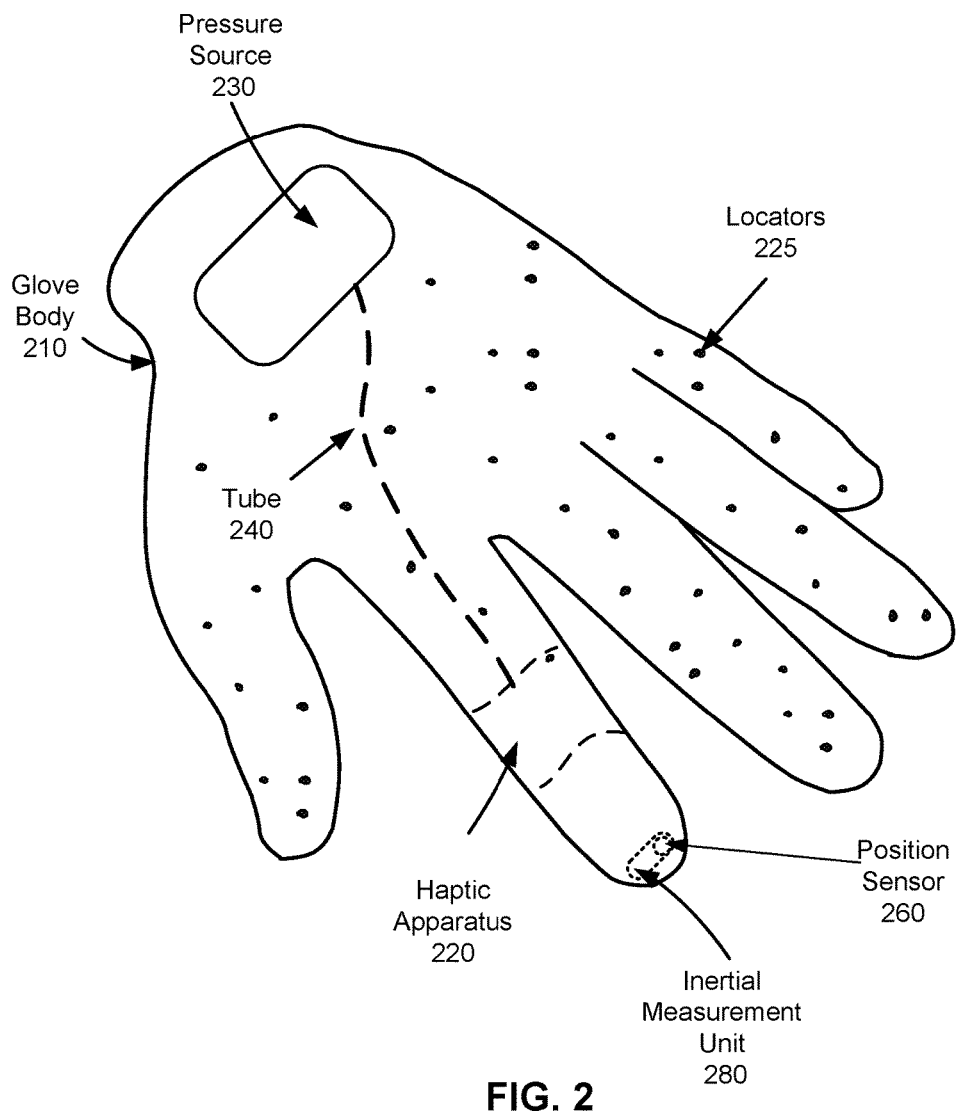
FIG. 2 is a perspective view of a haptic glove, in accordance with an embodiment.

FIG. 2 is a perspective view of a haptic glove 200, in accordance with an embodiment. In one embodiment, the haptic glove 200 includes a glove body 210, a haptic apparatus 220, a pressure source 230, a tube 240, locators 225, a position sensor 260, and an inertial measurement unit (IMU) 280. In some embodiments, the haptic glove 200 may be, e.g., the haptic assembly 140 of FIG. 1, the locators 225 may be e.g., locators 170 of FIG. 1; the position sensor 260 may be e.g., position sensor 175 of FIG. 1; and the IMU 280 may be e.g., the IMU 180 of FIG. 1. The user hand movement can be detected according to fast calibration data from the IMU 280 and/or slow calibration of the locators 225 from the imaging device 135. Moreover, haptic feedback including a perception of a user contacting a virtual object can be provided to the user by the pressure source 230, tube 240, and haptic apparatus 220.

The glove body 210 is an apparatus covering a hand. The glove body 210 is a garment that is coupled to the position sensor 260, the haptic apparatus 220, the pressure source 230, and the tube 240. In one embodiment, the position sensor 260 is coupled to a corresponding finger of the glove body 210 (e.g., a portion corresponding to a fingertip); the haptic apparatus 220 is coupled to a corresponding finger portion (e.g., a portion corresponding to a joint between two phalanges) of the glove body 210; and the pressure source 230 is coupled to a portion of the glove body 210 corresponding to a back of a hand (i.e., dorsal side). The tube 240 is coupled between the pressure source 230 and the haptic apparatus 220. In one embodiment, one or more of these components are placed beneath an outer surface of the glove body 210, thus are not visible from the outside. Additionally or alternatively, some of these components are placed on an outer surface of the glove body 210, and are visually detectable.

The glove body 210 illustrated in FIG. 2 is merely an example, and in different embodiments, the glove body 210 includes fewer, more or different components than shown in FIG. 2. For example, in other embodiments, there can be multiple haptic apparatuses 220 (e.g., one or more on each finger) and multiple tubes 240. In addition, in other embodiments, there may be multiple position sensors 260 provided. Also, in one or more embodiments, one or more haptic apparatuses 220 and the pressure source 230 can be positioned in different places than shown in FIG. 2. For example, additional haptic apparatuses 220 and the position sensors 260 are located at different parts of the glove body 210. For another example, the haptic apparatuses 220 are coupled to or wrap the entire fingers of the glove body 210. For another example, the pressure source 230 is coupled to a different portion of the glove body 210 corresponding to, for example a wrist or a palm.

The locators 225 are objects located in specific positions on the glove body 210 relative to one another. The configuration and operation of the locators 225 are similar to the locators 170 of the haptic assembly 140 of FIG. 1. Therefore, the detailed description thereof is omitted herein for the sake of brevity.

The position sensor 260 generates one or more measurement signals in response to motion of the haptic glove 200. The configuration and operation of the position sensors 260 are similar to the position sensors 175 of the haptic assembly 140 of FIG. 1. Therefore, the detailed description thereof is omitted herein for the sake of brevity.

The IMU 280 is an electronic device that generates fast calibration data based on measurement signals received from one or more of the position sensors 260. Based on the one or more measurement signals from one or more position sensors 260, the IMU 280 generates fast calibration data indicating an estimated position of the haptic glove 200 relative to an initial position of the haptic glove 200. The configuration and operation of the IMU 280 are similar to the IMU 180 of the haptic assembly 140 of FIG. 1. Therefore, the detailed description thereof is omitted herein for the sake of brevity.

The haptic apparatus 220 provides haptic feedback including a perception of a user touching a virtual object. In one embodiment, the haptic apparatus 220 is actuated according to pressure applied from the pressure source 230. In one embodiment, the haptic apparatus 220 is coupled to a portion corresponding to a joint between two phalanges of the glove body 210. In another embodiment, the haptic apparatus 220 covers the entire glove body 210 or several haptic apparatuses 220 are placed on other parts (e.g., an area corresponding to a joint between two different fingers) of the glove body 210.

The pressure source 230 modulates the haptic apparatus 220 by adjusting a pressure of the haptic apparatus 220. The pressure source 230 may be a pump to adjust the pressure of the haptic apparatus 220 by injecting (or ejecting) fluid or gas (e.g., air). The haptic apparatus 220 can be inflated to prevent a user movement or deflated to enable a user movement, according to pressure applied from the pressure source 230. Various structures and operations of the haptic apparatus 220 are described in detail with respect to FIGS. 3A, 3B, and 4.

In some embodiments, the pressure source 230 receives a haptic feedback signal from the VR/AR console 110, and actuates the haptic apparatus 220 accordingly. The pressure source 230 applies pressure to the haptic apparatus 220 based on the haptic feedback signal for inflating or deflating the haptic apparatus 220. In one embodiment, the haptic feedback signal identifies a haptic apparatus 220 from a plurality of haptic apparatuses 220 and an amount of actuation (or amount of pressure) to be applied, and the pressure source 230 applies pressure to the haptic apparatus 220 as identified by the haptic feedback signal.

FIG. 3A is a cross section view of a portion of the haptic glove 200 of FIG. 2 showing haptic apparatuses 310A, 310B, 310C, and 310D (herein generally referred to as "a haptic apparatus 310" or "an expandable bladder 310"), in accordance with an embodiment. In FIG. 3A, a user wears the haptic glove 200 to cover a finger 320. In FIG. 3A, the haptic apparatuses 310 are deflated for enabling a movement of the finger 320.

In one embodiment, each of the haptic apparatuses 310 is positioned at a portion of the haptic glove 200 corresponding to a joint between two phalanges of the finger 320. In the embodiment shown in FIG. 3A, the haptic apparatus 310A is located above a distal interphalangeal joint; the haptic apparatus 310C is located below the distal interphalangeal joint; the haptic apparatus 310B is located above a proximal interphalangeal joint; and the haptic apparatus 310D is located below the proximal interphalangeal joint. In one embodiment, the haptic apparatuses 310 are located underneath an outer surface of the haptic glove 200, and are invisible from outside.

In one embodiment, the haptic apparatuses 310 are implemented as expandable bladders for adjusting a movement of the finger 320. In one example as shown in FIG. 3A, the haptic apparatuses 310A, 310B, 310C, and 310D are deflated to enable the finger 320 to move, hence the user finger 320 can be bent in a direction 360 or straightened in an opposite direction of the direction 360.

FIG. 3B is a cross section view of a portion of the haptic glove 200 of FIG. 2 showing haptic apparatuses 310, in accordance with an embodiment. In FIG. 3B, the haptic apparatuses 310, 310B, 310C, and 310D are inflated to prevent the finger 320 to move, hence the user finger 320 can be neither bent in the direction 360, nor straightened in the opposite direction.

In one embodiment, the haptic apparatuses 310 are actuated according to a virtual position of the haptic glove 200 corresponding to a physical position of the haptic glove 200 and another virtual position of a virtual object. For example, if a bottom surface of the haptic glove 200 is in contact with the virtual object in a virtual space, the VR/AR console 110 generates a haptic feedback signal to inflate the haptic apparatuses 310C and 310D to prevent the finger 320 from bending in the direction 360. On the other hand, if the bottom surface of the haptic glove 200 is not in contact with the virtual object in the virtual space, the VR/AR console 110 generates a haptic feedback signal to deflate the haptic apparatuses 310C and 310D to enable the finger 320 from bending in the direction 360. For another example, if a top surface of the haptic glove 200 is in contact with the virtual object in the virtual space, the VR/AR console 110 generates a haptic feedback signal to inflate the haptic apparatuses 310A and 310B to prevent the finger 320 from straightening in the direction 360. On the other hand, if the top surface of the haptic glove 200 is not in contact with the virtual object in the virtual space, the VR/AR console 110 generates a haptic feedback signal to deflate the haptic apparatuses 310A and 310B to enable the finger 320 to be straightened in the direction 360. In one embodiment, the amount of inflation (or deflation) can be adjusted according to a hardness of a virtual object and a force of the user movement.

Figure 4:
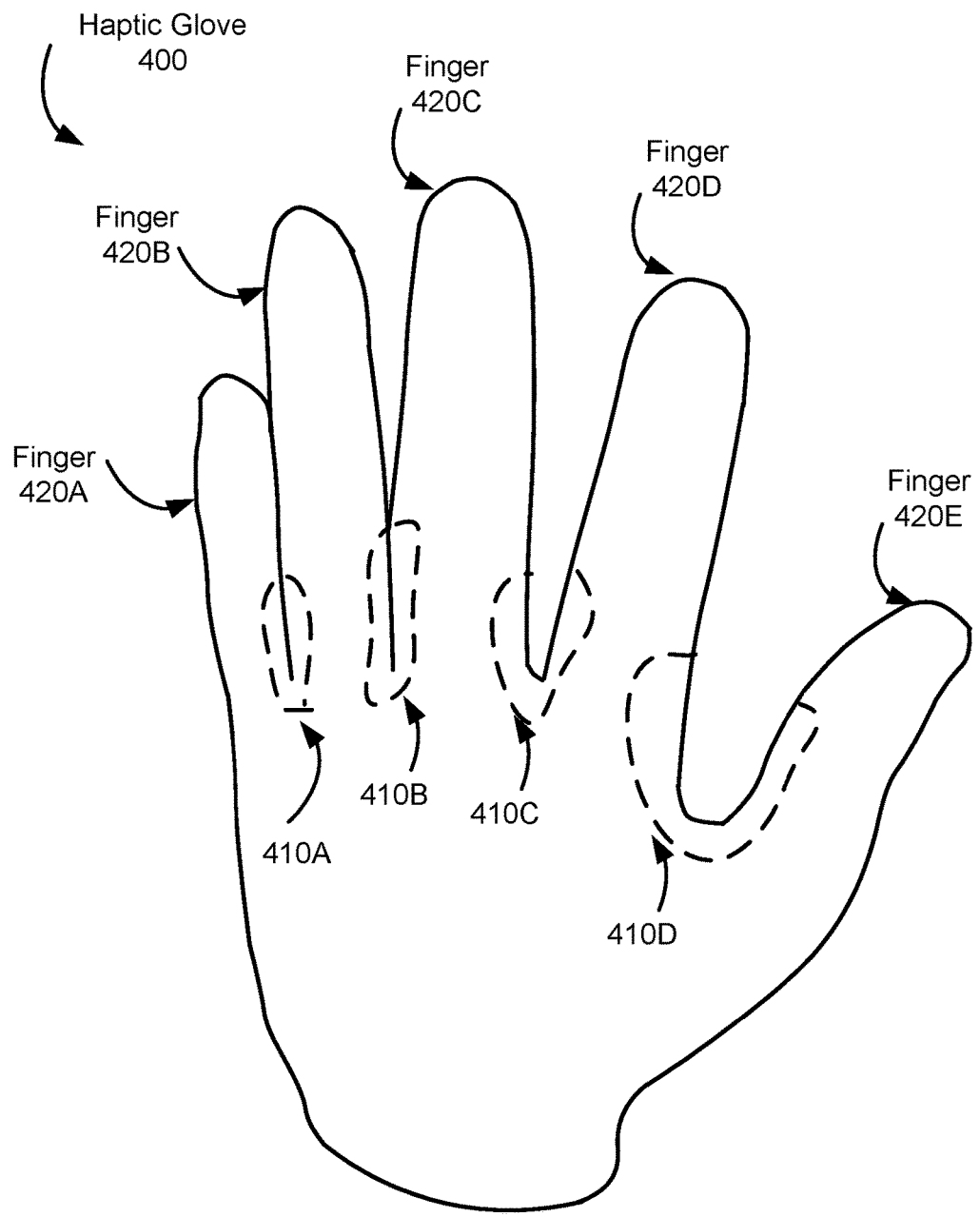
FIG. 4 illustrates a top plan view of the haptic glove of FIG. 2, according to an embodiment.

FIG. 4 is a top plan view of the haptic glove 200 of FIG. 2 showing haptic apparatuses 410A, 410B, 410C, and 410D (herein generally referred to as "a haptic apparatus 410" or "an expandable bladder 410"), in accordance with an embodiment. In one example, the pressure of haptic apparatuses 410 can be adjusted.

In one embodiment, each of the haptic apparatuses 410 is positioned at a portion of the haptic glove 200 corresponding to a joint between two phalanges of different fingers 420. In the embodiment shown in FIG. 4, the haptic apparatus 410A is located between a first portion (e.g., a first proximal phalanx) of the finger 420A and a second portion (e.g., a second proximal phalanx) of the finger 420B; the haptic apparatus 410B is located between the second proximal phalanx of the finger 420B and a third proximal phalanx of the finger 420C; the haptic apparatus 410C is located between the third proximal phalanx of the finger 420C and a fourth proximal phalanx of the finger 420D; and the haptic apparatus 410D is located between the fourth proximal phalanx of the finger 420D and a fifth proximal phalanx of the finger 420E. In one embodiment, the haptic apparatuses 410 are located underneath an outer surface of the haptic glove 200, and are invisible from outside.

In one embodiment, the haptic apparatuses 410 are implemented as expandable bladders for enabling or disabling movements of the fingers 420. For example, the haptic apparatus 410A is deflated to enable tips of the two fingers 420A and 420B to contact with each other, and is inflated to separate the tips of the two fingers 420A and 420B from each other. The amount of inflation (or deflation) can be adjusted to provide a corresponding amount of resistance to a user movement.

In one embodiment, the haptic apparatuses 410 are actuated according to a virtual position of the haptic glove 200 corresponding to a physical position of the haptic glove 200 and another virtual position of a virtual object. For example, if a virtual object is located between virtual positions of the two fingers 420D, 420E in a virtual space corresponding to physical positions of the two fingers 420D, 420E, the VR/AR console 110 generates a haptic feedback signal to inflate the haptic apparatus 410D to prevent the fingers 420D and 420E from contacting each other. By the same token, if no object is located between the virtual positions of the two fingers 420D, 420E in the virtual space corresponding to physical positions of the two fingers 420D, 420E, the VR/AR console 110 generates a haptic feedback signal to deflate the haptic apparatus 410D to enable the fingers 420D and 420E from contacting each other.

Figure 5:
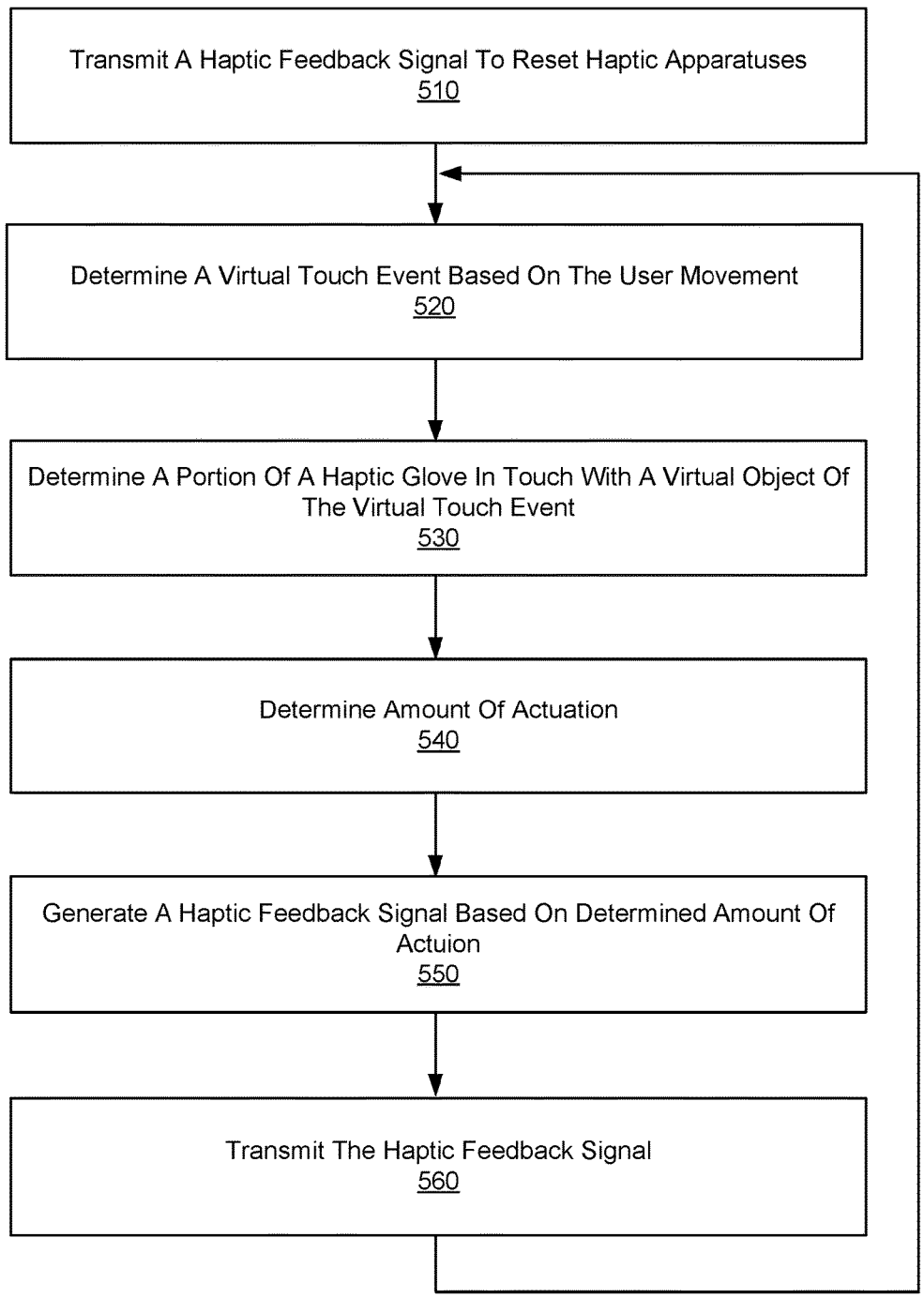
FIG. 5 is a flow chart illustrating a process of providing haptic feedback responsive to a virtual touch event in a virtual space, in accordance with an embodiment.

FIG. 5 is a flow chart illustrating a process of providing haptic feedback responsive to a virtual touch event in a virtual space, in accordance with an embodiment. In one embodiment, the process of FIG. 5 is performed by a console (e.g., VR/AR console 110 of FIG. 1). Other entities may perform some or all of the steps of the process in other embodiments. Likewise, embodiments may include different and/or additional steps, or perform the steps in different orders.

The console transmits 510 a haptic feedback signal to reset haptic apparatuses. For example, the haptic feedback signal deflates all of the haptic apparatuses. In other embodiments, the step 510 may be omitted.

The console determines 520 a virtual touch event occurred based on a user movement. In one embodiment, the console receives fast calibration data from the haptic glove and/or slow calibration data from the imaging device, and then determines a hand movement. In one approach, the console obtains 3-D map of the user hand describing coordinates of various parts of the haptic glove in a virtual space corresponding to physical positions of the parts of the haptic glove in reality based on the fast calibration data and/or the slow calibration data. The console compares the coordinate of the virtual object in the virtual space and the coordinate of the haptic glove in the virtual space to determine whether a virtual touch event occurred.

Responsive to determining the virtual touch event occurred, the console determines 530 a portion of the haptic glove of a haptic apparatus corresponding to the virtual touch event. For example, responsive to the user pressing a virtual object (e.g., a ball) in a virtual space with a bottom surface of an index finger, the console determines such virtual touch event occurred, and identifies the bottom surface of the index finger is in contact with the virtual object.

The console determines 540 an amount of actuation for each haptic apparatus. For example, responsive to determining that the bottom surface of the index finger is in contact with the virtual object, the console determines the force of the hand movement and compares the determined force with the value of hardness of the virtual object in contact. Responsive to determining that the value of the hardness is greater than the force of the hand movement, the console determines that the index finger is not allowed to bend inward and also determines an amount of actuation of the haptic apparatus for preventing the inward movement of the index finger. In one example, responsive to determining that the value of the hardness is less than the force of the hand movement, the console determines that the virtual object (e.g., glass) is shattered and also determines an amount of actuation of the haptic apparatus for providing no resistance to the inward movement. In another example, responsive to determining that the value of the hardness is less than the force of the hand movement, the console determines that virtual object (e.g., ball) should be deformed, and also determines an amount of actuation of the haptic apparatus for impeding (e.g., slowing or reducing a force of) the inward movement.

The console generates 550 a haptic feedback signal describing details of the haptic feedback to be provided, according to the amount of actuation determined for each haptic apparatus. In one embodiment, the haptic feedback signal indicates which haptic apparatus should be actuated (e.g., a coordinate), and an amount of actuation (e.g., amount of inflation or deflation).

The console transmits the haptic feedback signal 560 to the haptic glove for providing the haptic feedback. The haptic apparatus receives the haptic feedback signal, and then provides haptic feedback to the user according to the haptic feedback signal. The haptic feedback signal identifies a haptic apparatus 220 and an amount of actuation. The pressure source actuates the haptic apparatus 220 as identified by the haptic feedback signal, as described in detail with respect to FIGS. 1 through 4.

The console may repeat the steps of 520 through 560 during operation.

Additional Configuration Information

Figure 3:
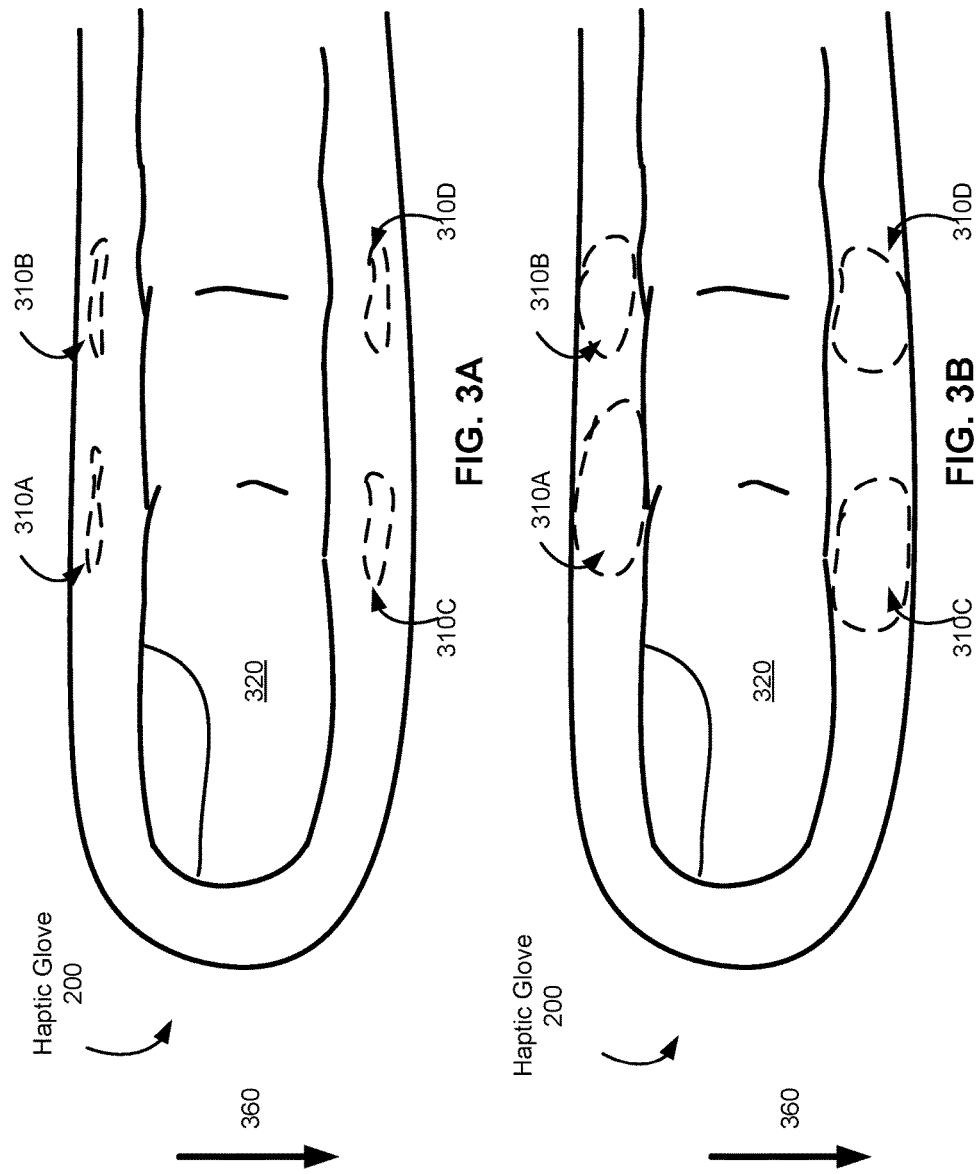
FIG. 3A is a cross section view of a portion of the haptic glove of FIG. 2 showing a deflated haptic apparatus, in accordance with an embodiment.
FIG. 3B is a cross section view of a portion of the haptic glove of FIG. 2 showing an inflated haptic apparatus, in accordance with another embodiment.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure. For example, even though a bladder 310 in FIG. 3 is depicted as covering a corresponding joint, there may be provided a plurality of bladders 310 for an area corresponding to a single joint, where each bladder has a smaller size (e.g., less than a few mm$^2$) than the bladder 310 depicted in FIG. 3. For example, an area corresponding to a single joint may include five or more bladders 310. For another example, there may be provided a plurality of pressure sources 230 in the haptic glove 200 of FIG. 2, which may be controlled individually or collectively as a group.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A haptic glove comprising:
    a glove body including a first portion, a second portion, and a third portion, the first portion corresponding to a first phalanx of a hand, the second portion corresponding to a second phalanx of the hand, and the third portion corresponding to a joint between the first phalanx and the second phalanx of the hand;
    an expandable bladder coupled to the glove body such that the expandable bladder abuts the third portion of the glove body, the expandable bladder having an adjustable size that controls an amount of relative movement between the first portion and the second portion of the glove body relative to a rest of the glove body; and
    a pressure source coupled to the glove body, wherein the pressure source is configured to adjust the size of the expandable bladder.

2. The haptic glove of claim 1, wherein the pressure source is configured to increase the size of the expandable bladder to resist the relative movement.

3. The haptic glove of claim 1, wherein the pressure source is configured to decrease the size of the expandable bladder to allow the relative movement.

4. The haptic glove of claim 1, further comprising a location sensor coupled to the glove body, the location sensor for determining a physical position of the glove body with respect to a reference point.

5. The haptic glove of claim 1, wherein the first phalanx and the second phalanx of the hand are part of a same finger of the hand.

6. The haptic glove of claim 1, wherein the first phalanx and the second phalanx of the hand are each part of a different finger of the hand.

7. A haptic glove comprising:
    a glove body including a first portion, a second portion, and a third portion, the first portion corresponding to a first phalanx of a hand, the second portion corresponding to a second phalanx of the hand, and the third portion corresponding to a joint between the first phalanx and the second phalanx of the hand;
    an expandable bladder coupled to the glove body such that the expandable bladder abuts the third portion of the glove body, the expandable bladder having an adjustable size that controls an amount of relative movement between the first portion and the second portion of the glove body relative to a rest of the glove body; and
    a pressure source coupled to the glove body, wherein the pressure source is configured to adjust the size of the expandable bladder, via adjusting fluid pressure within the expandable bladder, to resist the relative movement between the first portion and the second portion of the glove body based in part on instructions received from a console.

8. The haptic glove of claim 7, wherein the pressure source is configured to decrease the fluid pressure of the expandable bladder to allow the relative movement between the first portion and the second portion of the glove body.

9. The haptic glove of claim 7, wherein the pressure source is configured to increase the fluid pressure of the expandable bladder to resist the relative movement between the first portion and the second portion of the glove body.

10. The haptic glove of claim 7, further comprising a location sensor coupled to the glove body, the location sensor for determining a physical position of the glove body with respect to a reference point.

11. The haptic glove of claim 7, wherein the first phalanx and the second phalanx of the hand are part of a same finger of the hand.

12. The haptic glove of claim 7, wherein the first phalanx and the second phalanx of the hand are each part of a different finger of the hand.

13. A haptic glove comprising:
 a glove body including a first portion, a second portion, and a third portion, the first portion corresponding to a first location on a first phalanx of a hand, the second portion corresponding to a second location on a second phalanx of the hand, and the third portion corresponding to a joint between the first location and the second location of the hand;
 an expandable bladder coupled to the glove body such that the expandable bladder abuts the third portion of the glove body, the expandable bladder having an adjustable size that controls an amount of relative movement between the first portion and the second portion of the glove body relative to a rest of the glove body; and
 a pressure source coupled to the glove body, wherein the pressure source is configured to adjust the size of the expandable bladder, via adjusting fluid pressure within the expandable bladder.

14. The haptic glove of claim 13, wherein the pressure source is configured to increase the fluid pressure of the expandable bladder to resist the relative movement.

15. The haptic glove of claim 13, wherein the pressure source is configured to decrease the fluid pressure of the expandable bladder to allow the relative movement.

* * * * *